US009123188B2

United States Patent
Nakamura et al.

(10) Patent No.: US 9,123,188 B2
(45) Date of Patent: Sep. 1, 2015

(54) ACCELERATION SENSOR FAULT DETECTION APPARATUS

(71) Applicant: Hitachi Automotive Systems, Ltd., Hitachinaka-shi, Ibaraki (JP)

(72) Inventors: Toshiaki Nakamura, Hitachinaka (JP); Masahide Hayashi, Mito (JP)

(73) Assignee: Hitachi Automotive Systems, Ltd., Hitachinaka-shi (JP)

( * ) Notice: Subject to any disclaimer, the term of this patent is extended or adjusted under 35 U.S.C. 154(b) by 0 days.

(21) Appl. No.: 13/963,235

(22) Filed: Aug. 9, 2013

(65) Prior Publication Data

US 2014/0058617 A1    Feb. 27, 2014

(30) Foreign Application Priority Data

Aug. 22, 2012  (JP) ................. 2012-182838

(51) Int. Cl.
*G07C 5/08*  (2006.01)
*B60T 8/88*  (2006.01)
*G05B 23/02*  (2006.01)

(52) U.S. Cl.
CPC . *G07C 5/08* (2013.01); *B60T 8/885* (2013.01); *G05B 23/0221* (2013.01); *G07C 5/0808* (2013.01)

(58) Field of Classification Search
CPC .... G07C 5/08; G07C 5/0808; G05B 23/0221; B60T 8/885
USPC ................................................. 701/29.7–31.3
See application file for complete search history.

(56) References Cited

U.S. PATENT DOCUMENTS

| 4,038,876 A | * | 8/1977 | Morris | ........................... 73/1.38 |
| 2005/0167960 A1 | * | 8/2005 | Tanaka et al. | ................. 280/735 |
| 2006/0020379 A1 | * | 1/2006 | Salman et al. | .................. 701/29 |

FOREIGN PATENT DOCUMENTS

JP    4-203969 A    7/1992

* cited by examiner

*Primary Examiner* — Thomas Tarcza
*Assistant Examiner* — Kevin Myhre
(74) *Attorney, Agent, or Firm* — Crowell & Moring LLP

(57) ABSTRACT

Provided is an acceleration detection apparatus installed in a vehicle and including a plurality of acceleration sensors having different characteristics, a function to input diagnosis signals in order to diagnose the outputs of the acceleration sensors and diagnose the fault detection functions while the vehicle stops, and a function to compare the outputs of the sensors in order to detect a fault while the vehicle runs.

10 Claims, 8 Drawing Sheets

ACCELERATION SENSOR FAULT DETECTION APPARATUS

BACKGROUND OF THE INVENTION

1. Field of the Invention

The present invention relates to an apparatus for detecting acceleration and, in particular, to a self-diagnostic function of an acceleration sensor to be installed in a vehicle.

2. Description of the Related Art

JP-H04-203969-A discloses an apparatus as a function that diagnoses an acceleration sensor to be installed in a vehicle.

SUMMARY OF THE INVENTION

A vehicle is equipped with a plurality of acceleration sensors needed for detecting a collision or a skid of the vehicle in order to ensure the safety during running. However, such sensors needs to be kept highly reliable when being placed and operated in environments such as an engine room where the temperature varies over a wide range, and vibration and electromagnetic noise have significant impacts on the sensors. Thus, a fault diagnosis needs to continuously be performed without interrupting a normal operation of the acceleration sensor during running. To solve such a problem, JP-H04-203969-A discloses an example in which a vehicle includes a high acceleration sensor configured to detect a high acceleration for detecting a collision of the vehicle and a low acceleration sensor configured to detect a low acceleration for detecting a skid of the vehicle to compare the outputs of the two sensors in order to perform a fault diagnosis for determining whether the sensors properly operate.

In light of the foregoing, an object of the present invention is to ensure a high fault diagnostic ability.

The above object is achieved by an acceleration detection apparatus installed in a vehicle including: a plurality of acceleration sensors having different characteristics; a function to input diagnosis signals to diagnose outputs of the acceleration sensors and diagnose fault detection functions of the acceleration sensors while the vehicle stops; and a function to compare the outputs of the sensors in order to detect a fault while the vehicle runs.

Diagnosing the performances and the fault detection functions of two sensors having different characteristics while the vehicle stops and detecting a fault by comparing the outputs of the two acceleration sensors while the vehicle runs can ensure a high fault diagnostic ability.

DESCRIPTION OF THE PREFERRED EMBODIMENTS

Hereinafter, embodiments of the present invention will be described with reference to FIGS. 1 to 8.

Figure 1:
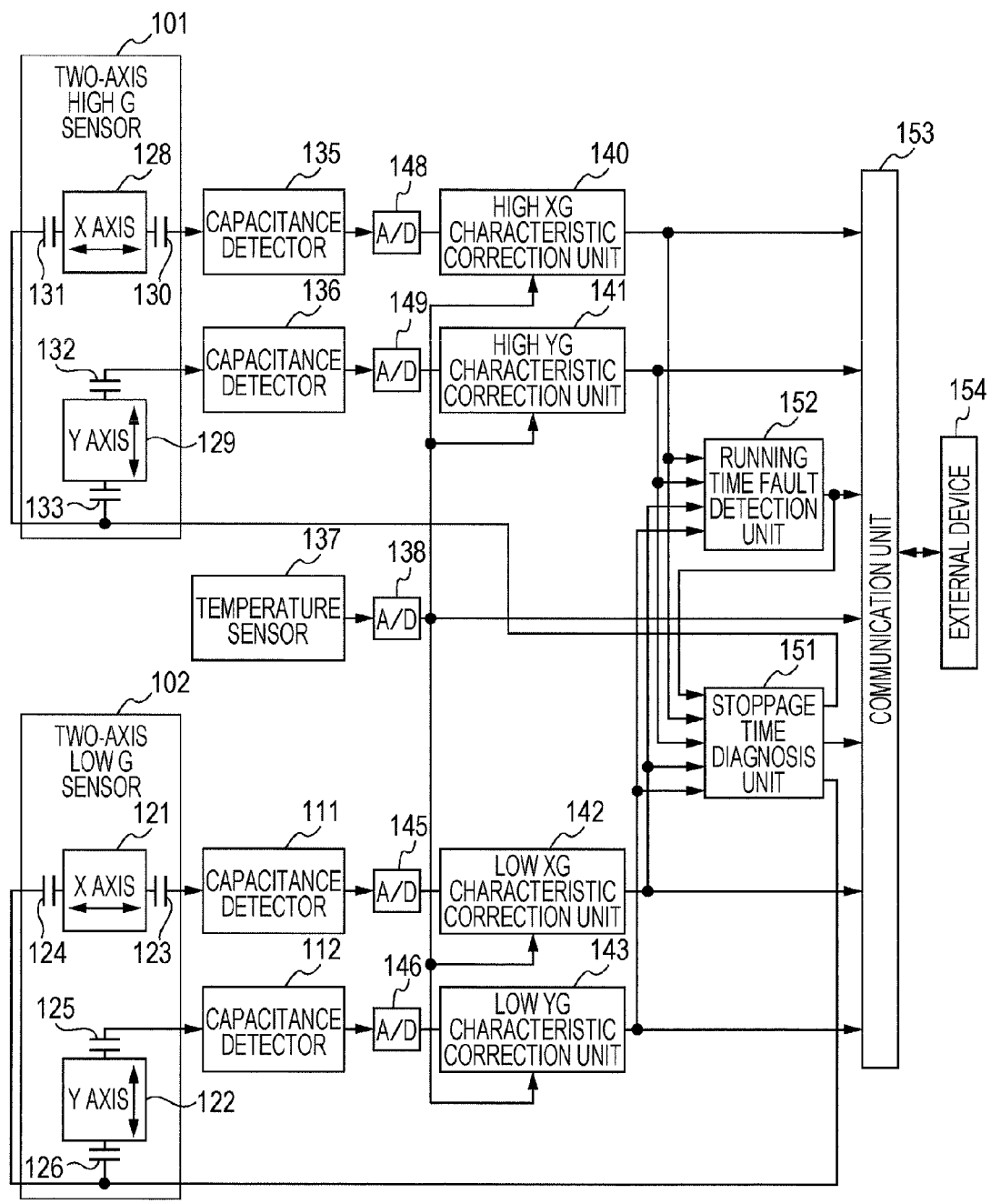
FIG. 1 is a block diagram of an acceleration sensor control circuit according to an embodiment.

FIG. 1 is a block diagram of a control circuit of acceleration sensors (hereinafter, referred to as G sensors) according to a first embodiment. A two-axis high G sensor 101 of the present embodiment includes an oscillator 128, an oscillator 129, electrodes 130 and 132, and electrodes 131 and 133. The oscillator 128 is displaced when acceleration is added in a horizontal direction (hereinafter, referred to as an X-axis direction). The oscillator 129 is displaced when acceleration is added in a longitudinal direction (hereinafter, referred to as a Y-axis direction). The electrodes 130 and 132 detect the amounts of displacement in the X-axis and the Y-axis directions according to the variation of capacitance. The electrodes 131 and 133 apply voltages in order to forcibly displace the oscillator 128 in the X-axis direction and the oscillator 129 in the Y-axis direction. The two-axis high G sensor 101 further includes capacitance detectors 135 and 136 and AD converters 148 and 149. The capacitance detectors 135 and 136 detect the variation of capacitance due to the displacement and output the variation as a voltage. The AD converters 148 and 149 convert the detected voltage into a digital signal.

Similarly, a two-axis low G sensor 102 includes an oscillator 121, an oscillator 122, electrodes 123 and 125, and electrodes 124 and 126. The oscillator 121 is displaced when acceleration is added in the X-axis direction. The oscillator 122 is displaced when acceleration is added in the Y-axis direction. The electrodes 123 and 125 detect the amounts of displacement in the X-axis and the Y-axis directions according to the variation of capacitance. The electrodes 124 and 126 apply voltages in order to forcibly displace the oscillator 121 in the X-axis direction and the oscillator 122 in the Y-axis direction. The two-axis low G sensor 102 further includes capacitance detectors 111 and 112 and AD converters 145 and 146. The capacitance detectors 111 and 112 detect the variation of capacitance due to the displacement and output the variation as a voltage. The AD converters 145 and 146 convert the detected voltage into a digital signal.

The control circuit includes a temperature sensor 137 and an AD converter 138. The temperature sensor 137 detects an ambient temperature and converts the temperature into a voltage in order to output the voltage. The AD converter 138 converts the output voltage into a digital signal.

Further, the control circuit includes characteristic correction units 140 and 141 that collect the outputs of the high G acceleration sensor and characteristic correction units 142 and 143 that collect the outputs of the low G acceleration sensor according to the output of the temperature sensor 137.

Further, the control circuit includes a stoppage time diagnosis unit 151 that diagnoses the high G sensor and the low G sensor while the vehicle stops and a running time fault detection unit 152 that diagnoses the two G sensors while the vehicle runs.

Further, the control circuit includes a communication unit 153 that outputs the outputs of the sensors to an external device 154.

Next, the operation of the control circuit will be described. Acceleration added in the X-axis direction displaces the oscillator 128 in the two-axis high G sensor 101 and causes the variation of capacitance at a fixed electrode 130 according to the displacement. Then, a signal of the displacement of the oscillator obtained through the capacitance detector 135 and the AD converter 148 is detected as acceleration. The system of the oscillator 129 for detecting the acceleration in the Y-axis direction operates similarly to the system of the oscillator 128.

Next, acceleration added in the X-axis direction displaces the oscillator 121 in the two-axis low G sensor 102 and causes the variation of capacitance at a fixed electrode 123 according to the displacement. Then, a signal of the displacement of the oscillator obtained through the capacitance detector 111 and the AD converter 145 is detected as acceleration. The system of the oscillator 122 for detecting the acceleration in the Y-axis direction operates similarly to the system of the oscillator 121.

Next, the high XG characteristic correction unit 140 and the high YG characteristic correction unit 141 remove the high-frequency noise component from the outputs of the acceleration in the two directions using a temperature correction operation and a low-pass filter according to the value detected by the temperature sensor 137.

Next, the low XG characteristic correction unit 142 and the low YG characteristic correction unit 143 remove the high-frequency noise component from the outputs of the acceleration in the two directions using a temperature correction operation and a low-pass filter according to the value detected by the temperature sensor 137.

Next, the stoppage time diagnosis unit 151 diagnoses the two-axis high G sensor 101 and the two-axis low G sensor 102 while the vehicle stops. Next, the running time fault detection unit 152 detects a fault of the two-axis high G sensor 101 and the two-axis low G sensor 102 while the vehicle runs.

Next, the communication unit 153 transmits the values of acceleration detected at the two-axis high G sensor 101 and the two-axis low G sensor 102, the output of the stoppage time diagnosis unit 151, and the output of the running time fault detection unit 152 to an external device.

Figure 2:
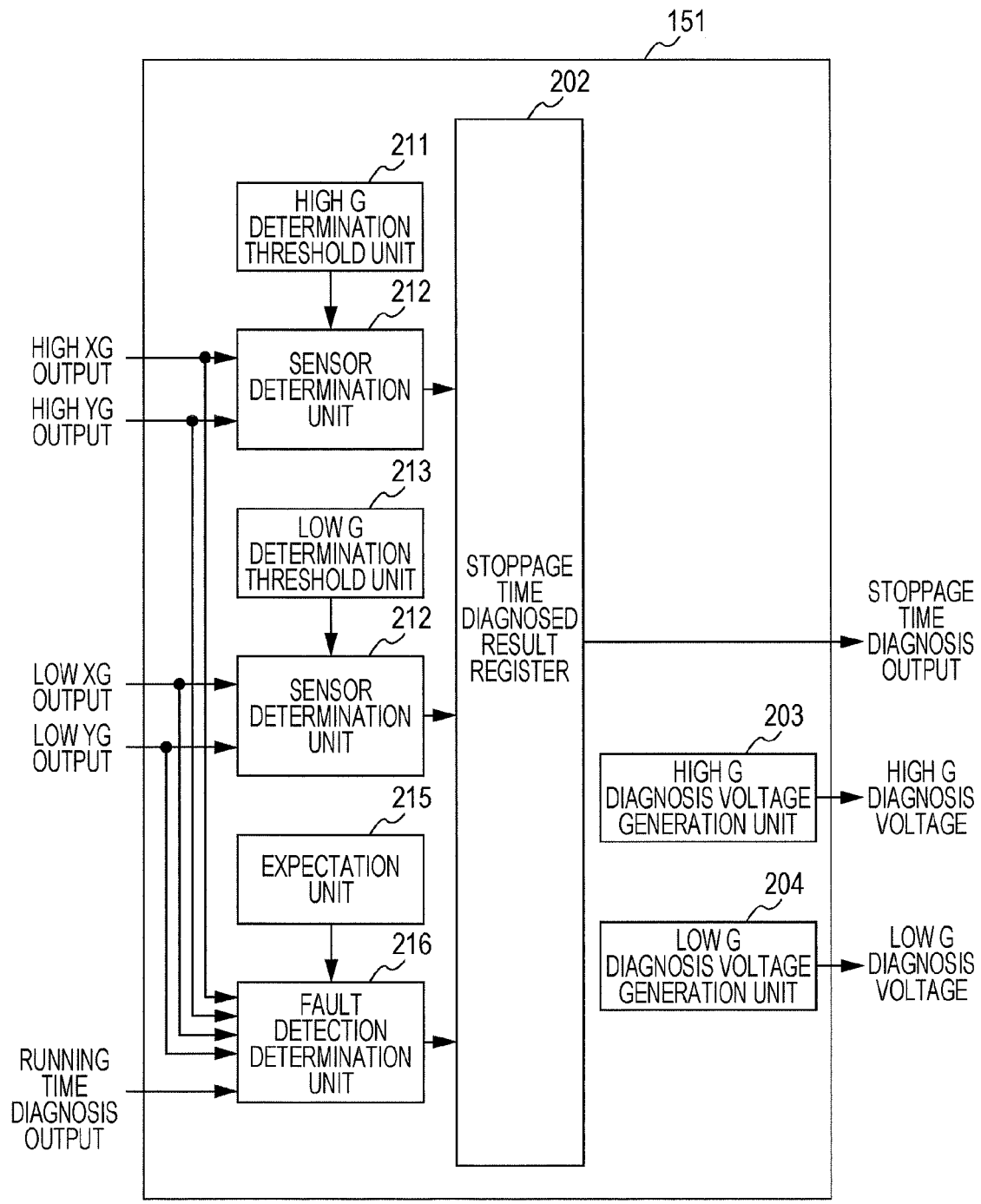
FIG. 2 is a block diagram of a stoppage time diagnosis unit according to an embodiment.

FIG. 2 illustrates an embodiment of the stoppage time diagnosis unit 151 of FIG. 1. Each of a high G determination threshold unit 211 and a low G determination threshold unit 213 is a register configured to store a threshold for determining a diagnosis. A sensor determination unit 212 is a function to diagnose the output of the acceleration sensor. The operation of the sensor determination unit 212 will be described in detail in FIG. 3. An expectation unit 215 is a register configured to store the expectation to be detected for performing a diagnosis of the fault detection function of the running time fault detection unit 152. A fault detection determination unit 216 is a function to perform a diagnosis of the running time fault detection unit 152. The operation of the fault detection determination unit 216 will be described in detail in FIG. 4. A stoppage time diagnosed result register 202 stores the outputs of two sensor determination units 212 and the output of the fault detection determination unit 216. A high G diagnosis voltage generation unit 203 is a function to apply constant voltages to the electrodes 131 and 133 in order to forcibly displace the oscillator 128 in the X-axis direction and the oscillator 129 in the Y-axis direction when the acceleration detection function is diagnosed as the process of the stoppage time diagnosis unit 151. A low G diagnosis voltage generation unit 204 functions to apply constant voltages to the electrodes 124 and 126 to forcibly displace the oscillator 121 in the X-axis direction and the oscillator 122 in the Y-axis direction in order to diagnose the acceleration detection function when the process of the stoppage time diagnosis unit 151 is performed.

Figure 3:
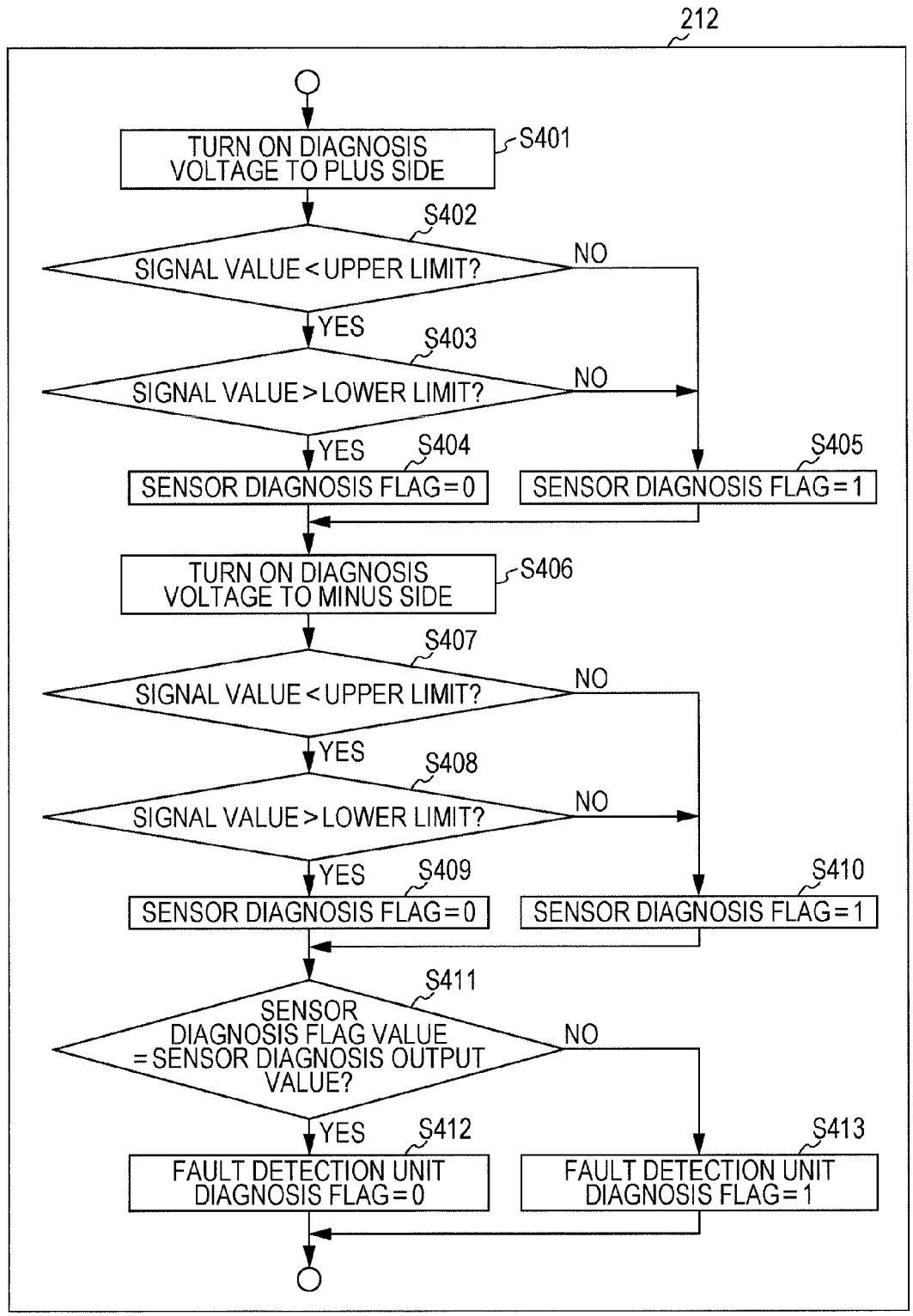
FIG. 3 is a flowchart of a sensor determination unit according to an embodiment.

FIG. 3 illustrates an embodiment of the sensor determination units 212 of FIG. 2. First, the diagnosis voltage generation units 203 and 204 apply voltages for displacing the oscillators 121, 122, 128, and 129 to the plus side. When each of the output signals from the oscillators 121 and 122 is within the determination threshold on the plus side that is stored in the low G determination threshold unit 213 and each of the output signals from the oscillators 128 and 129 is within the determination threshold on the plus side that is stored in the high G determination threshold unit 211, "0" is output as a sensor diagnosis flag. On the other hand, when each of the output signals from the oscillators is not within each of the determination thresholds, "one" is output as the sensor diagnosis flag. Next, the diagnosis voltage generation units 203 and 204 apply voltages for displacing the oscillators 121, 122, 128, and 129 to the minus side. Then, the same process as the diagnosis on the plus side is performed using each of the determination thresholds on the minus side that is stored in each of the high G determination threshold unit 211 and the low G determination threshold unit 213. Next, it is determined whether the diagnosis flag value found above has the same value as the signal value output from the sensor determination unit 212. This process is a function to diagnose the circuit part of the sensor determination unit 212.

Figure 4:
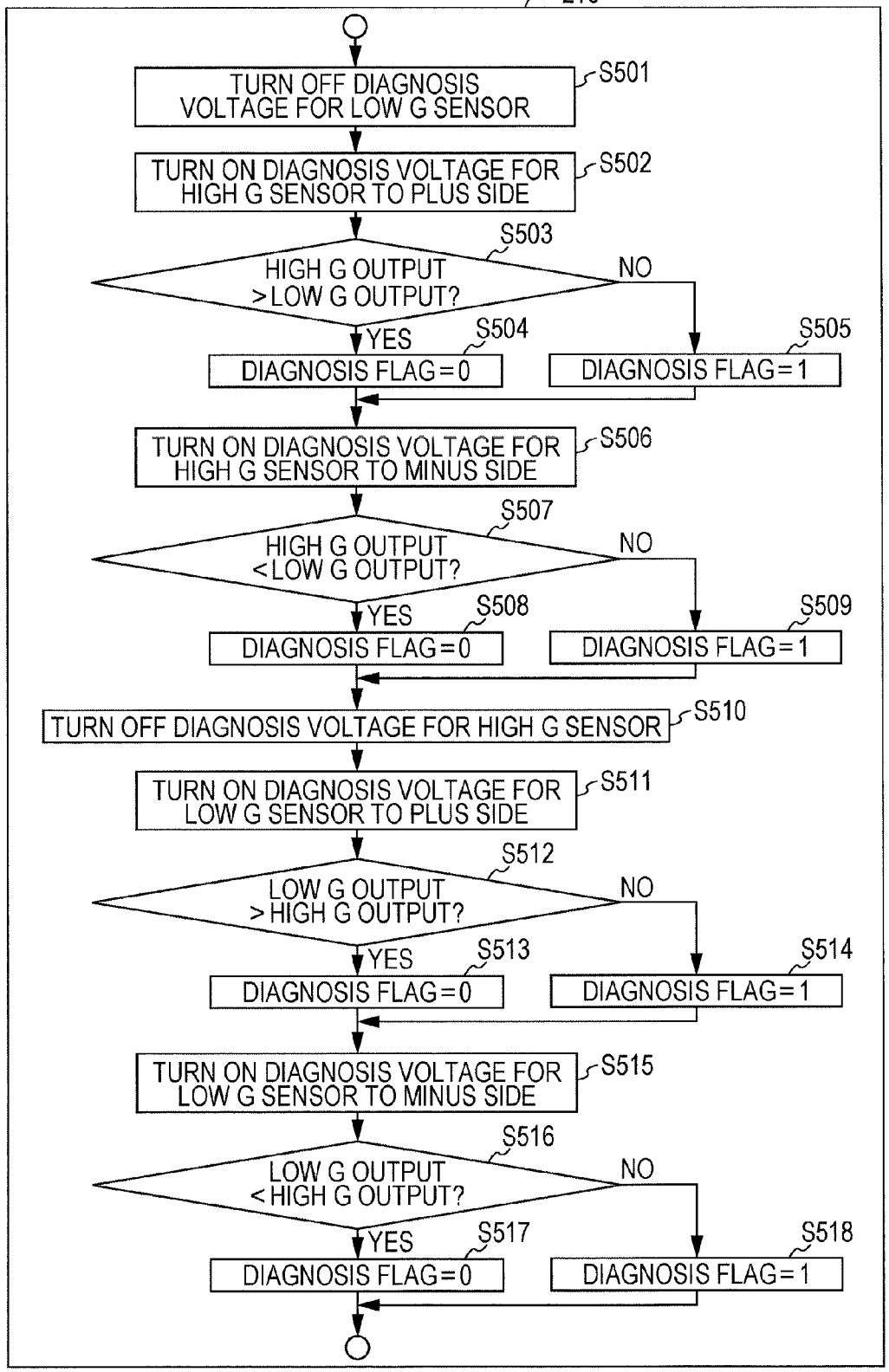
FIG. 4 is a flowchart of a fault detection determination unit according to an embodiment.

FIG. 4 illustrates an embodiment of the operation of the fault detection determination unit 216 which detects the fault of running time fault detection unit 152 during a running time in FIG. 2. First, the diagnosis voltage for the low G sensor is turned OFF (0 V). Next, the diagnosis voltage for the high G sensor is turned ON to the plus side (2.5 V). In that condition, it is determined whether the output of the high G sensor is larger than the output of the low G sensor. When the output of the high G sensor is larger than the output of the low G sensor, it is determined that the fault detection is normal and "0" is set at the diagnosis flag. Otherwise, it is determined that the fault detection is abnormal and "1" is set at the diagnosis flag. Next, the diagnosis voltage for the high G sensor is turned ON to the minus side (−2.5 V). In that condition, it is determined whether the output of the high G sensor is smaller than the output of the low G sensor. When the output of the high G sensor is smaller than the output of the low G sensor, it is determined that the fault detection is normal and "0" is set at the diagnosis flag. Otherwise, it is determined that the fault detection is abnormal and "1" is set at the diagnosis flag. Next, the diagnosis voltage for the high G sensor is turned OFF (0 V). Next, the diagnosis voltage for the low G sensor is turned ON to the plus side (2.5 V). In that condition, it is determined whether the output of the low G sensor is larger than the output of the high G sensor. When the output of the low G sensor is larger than the output of the high G sensor, it is determined that the fault detection is normal and "0" is set at the diagnosis flag. Otherwise, it is determined that the fault detection is abnormal and "1" is set at the diagnosis flag. Next, the diagnosis voltage for the low G sensor is turned ON to the minus side (−2.5 V). In that condition, it is determined whether the output of the low G sensor is smaller than the output of the high G sensor. When the output of the low G sensor is smaller than the output of the high G sensor, it is determined that the fault detection is normal and "0" is set at the diagnosis flag. Otherwise, it is determined that the fault detection is abnormal and "1" is set at the diagnosis flag.

Figure 5:
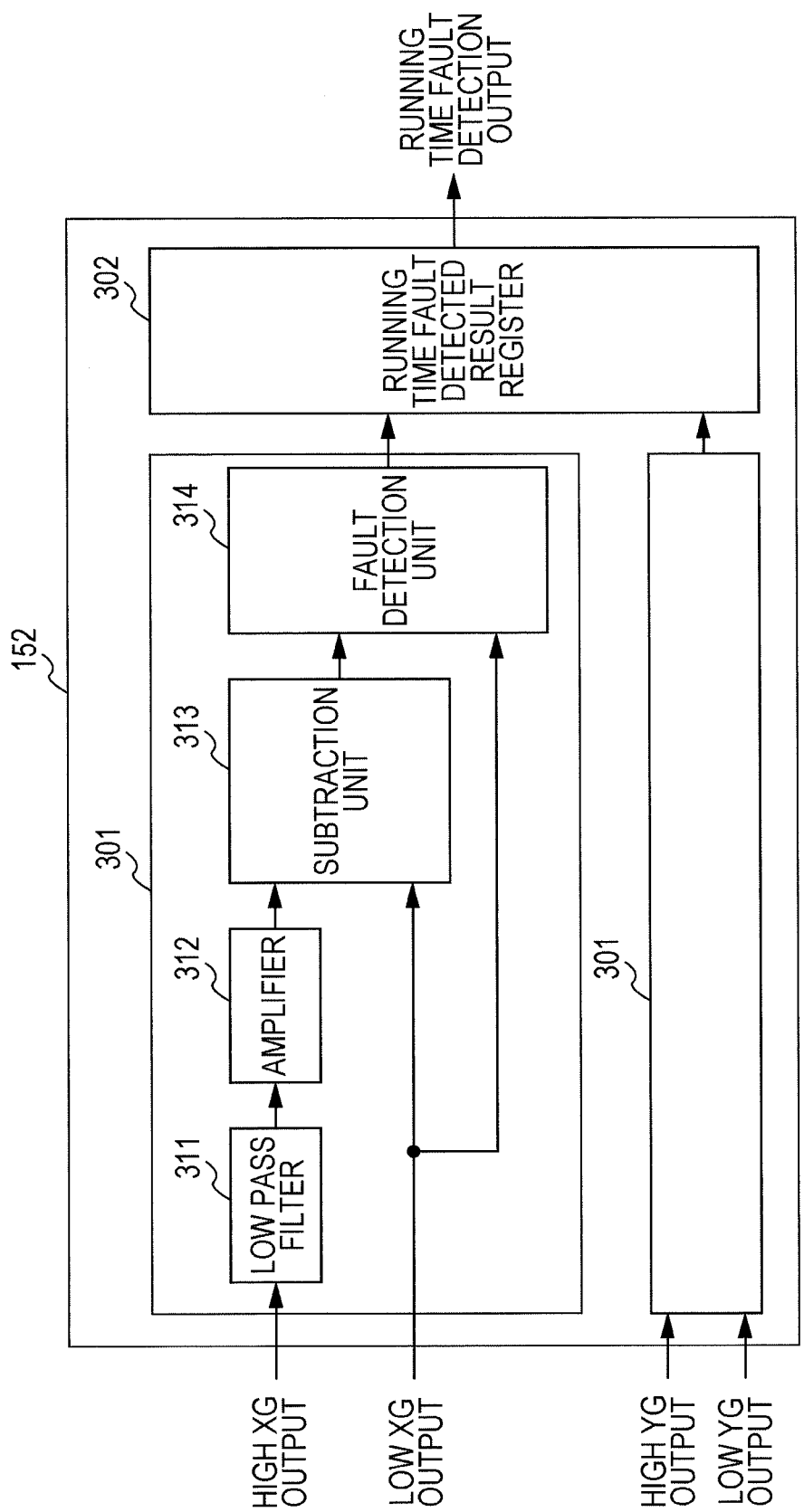
FIG. 5 is a block diagram of a running time diagnosis unit according to an embodiment.

FIG. 5 illustrates an embodiment of the running time fault detection unit 152. In a running time fault detection process unit 301, a low pass filter 311 is a function to adjust the phase of the output of the high G sensor that is displaced fast to the phase of the output of the low G sensor that is displaced slowly. Next, an amplifier 312 is a function to match the output value of the high G sensor with the output value of the low G sensor when acceleration is generated. A subtraction unit 313 is a function to subtract the output of the low G sensor from the output of the high G sensor. Next, a fault detection unit 314 is a function to detect a fault of the high G sensor and the low G sensor from the output of the subtraction unit 313 and the output of the low G sensor. A running time fault detected result register 302 stores fault detected results of the high G sensor and the low G sensor in the X direction and the Y direction.

Figure 6:
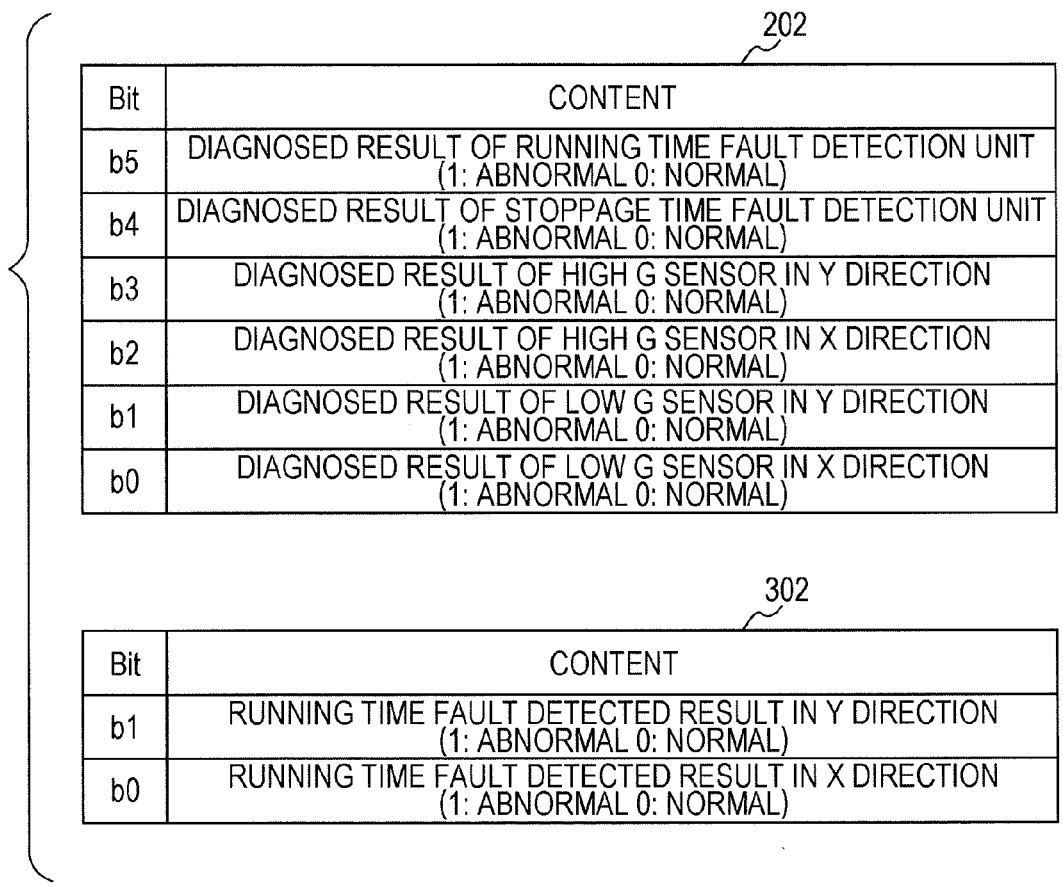
FIG. 6 is a configuration diagram of a stoppage time diagnosed result register and a running time fault detected result register according to an embodiment.

FIG. 6 illustrates exemplary storages of the outputs in the stoppage time diagnosed result register 202 and the running time fault detected result register 302.

Figure 7:
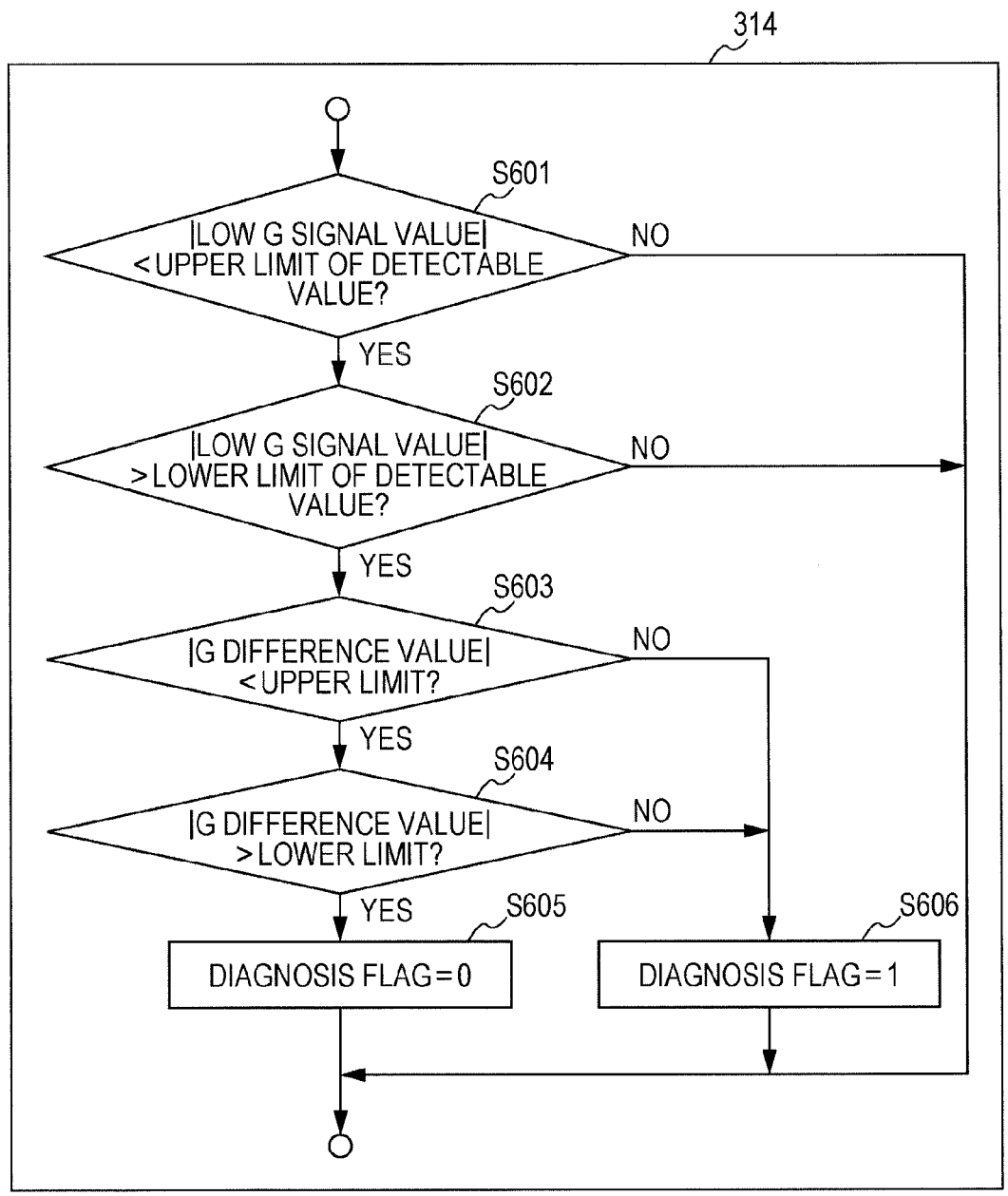
FIG. 7 is a flowchart of a fault detection determination unit during running according to an embodiment.

FIG. 7 illustrates an embodiment of the fault detection unit 314 in FIG. 5. When an absolute value of the output of the subtraction unit 313 is smaller than the upper limit of the detectable value (for example, the detected maximum value of the low G sensor) and is larger than the lower limit of the detectable value (for example, the output of the low G sensor is "0"), the successive process in the fault detection unit 314 is performed. Otherwise, it is determined that the detected value is not, normal and the process in the fault detection unit 314 is not performed. Next, when the absolute value of the difference between the output of the high G sensor and the output of the low G sensor that is output from the subtraction unit 313 is within the range of the upper value and the lower value of the determination, it is determined that there is not a fault and the diagnosis flag is set at "0". Otherwise, it is determined that there is a fault and the diagnosis flag is set at "1".

Figure 8:
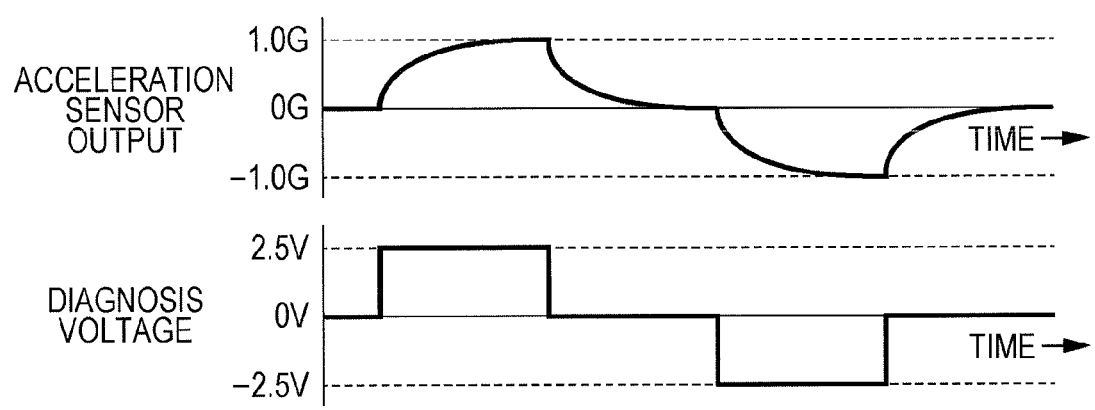
FIG. 8 is a timing diagram of a diagnosis voltage generation unit according to an embodiment.

FIG. 8 illustrates examples of the output signal of each of the diagnosis voltage generation units 203 and 204 in FIG. 2 and the output of the acceleration sensor. For example, the high G sensor outputs "0 G" when the diagnosis voltage is 0 V. The high G sensor outputs "50 G" (49 m/s$^2$) when the diagnosis voltage is 2.5 V. The high G sensor is controlled to output "−50 G" (−49 m/s$^2$) when the diagnosis voltage is −2.5 V. Further, the low G sensor outputs "0 G" when the diagnosis voltage is 0 V. The low G sensor outputs "1 G" (0.98 m/s$^2$) when the diagnosis voltage is 2.5 V. The low G sensor is controlled to output "−1 G" (−0.98 m/s$^2$) when the diagnosis voltage is −2.5 V.

What is claimed is:

1. An acceleration detection apparatus installed in a vehicle comprising:
    a plurality of acceleration sensors;
    a stoppage-time diagnosis unit; and
    a running-time fault diagnosis unit, wherein
    the stoppage-time diagnosis unit is configured to detect faults in the acceleration sensors when the vehicle is stopped, and
    the running-time diagnosis unit is configured to detect faults in the acceleration sensors when the vehicle is running,
    the stoppage-time diagnosis unit is also configured to detect faults in the running-time diagnosis unit when the vehicle is running.

2. The acceleration detection apparatus of claim 1, wherein the stoppage time diagnosis unit comprises:
    a sensor determination unit; and
    a first fault-detection unit
        configured to diagnose an operation of the running-time diagnosis unit.

3. The acceleration detection apparatus of claim 1, wherein the running-time fault detection unit further comprises:
    a low pass filter;
    an amplifier;
    a subtractor; and
    a second fault-detection unit.

4. The acceleration detection apparatus of claim 3, wherein
    the low-pass filter is configured to determine whether one or more outputs of the acceleration sensors are within a predetermined range,
    the amplifier unit is configured to match output values of the acceleration sensors when the vehicle is accelerated,
    the subtractor is configured to determine a difference in output values of the acceleration sensors, and
    the second fault-detection unit is configured to determine whether the difference in output values is within a predetermined range.

5. The acceleration detection apparatus of claim 1, wherein the acceleration sensors include a low-G sensor and a high-G sensor.

6. An acceleration detection apparatus installed in a vehicle comprising:
    a plurality of acceleration sensors;
    first fault-detection means for diagnosing the acceleration sensors while the vehicle is stopped; and
    second fault-detection means for diagnosing the acceleration sensors while the vehicle is running;
    wherein the first fault-detection means is configured to detect faults in the second fault-detection means when the vehicle is running.

7. The acceleration detection apparatus of claim 6, wherein the first fault-detection means further comprises:
    sensor-determination means; and
    means for diagnosing the second fault-detection means.

8. The acceleration detection apparatus of claim 6, wherein the second fault-detection means further comprises:
    phase-adjustment means;
    matching means;
    difference means; and
    third fault-detection means.

9. The acceleration detection apparatus of claim 8, wherein
    the phase-adjustment means determine whether one or more outputs of the acceleration sensors are within a predetermined range,
    the matching means matches output values of the acceleration sensors when the vehicle is accelerated,
    the difference means determines a difference in output values of the acceleration sensors, and
    the third fault-detection means determines whether the difference in output values is within a predetermined range.

10. The acceleration detection apparatus of claim 6, wherein the acceleration sensors include a low-G sensor and a high-G sensor.

* * * * *